(12) United States Patent
Dechamp

(10) Patent No.: US 8,301,339 B2
(45) Date of Patent: Oct. 30, 2012

(54) METHOD FOR CONTROLLING A STEER-BY-WIRE STEERING SYSTEM

(75) Inventor: Francois Dechamp, Cluny (FR)

(73) Assignee: Renault Trucks, St. Priest (FR)

( * ) Notice: Subject to any disclaimer, the term of this patent is extended or adjusted under 35 U.S.C. 154(b) by 982 days.

(21) Appl. No.: 12/089,924

(22) PCT Filed: Oct. 11, 2005

(86) PCT No.: PCT/IB2005/003646
§ 371 (c)(1),
(2), (4) Date: Nov. 25, 2008

(87) PCT Pub. No.: WO2007/042860
PCT Pub. Date: Apr. 19, 2007

(65) Prior Publication Data
US 2012/0116636 A1        May 10, 2012

(51) Int. Cl.
*B62D 7/09*        (2006.01)
*B62D 9/00*        (2006.01)
(52) U.S. Cl. .......................................... 701/41; 180/402
(58) Field of Classification Search .................. None
See application file for complete search history.

(56) References Cited

U.S. PATENT DOCUMENTS

| 6,219,604 | B1 | 4/2001 | Dilger et al. |
| 6,226,581 | B1 | 5/2001 | Reimann et al. |
| 6,662,898 | B1 * | 12/2003 | Mattson et al. ............... 180/446 |
| 6,757,601 | B1 | 6/2004 | Yao et al. |
| 6,789,008 | B2 * | 9/2004 | Kato et al. ..................... 701/41 |
| 6,795,761 | B1 | 9/2004 | Lee et al. |
| 2002/0030407 | A1 | 3/2002 | Nishizaki et al. |

FOREIGN PATENT DOCUMENTS
EP        1110835 A        6/2001

OTHER PUBLICATIONS

International Search Report from corresponding International Application PCT/IB2005/003646.

* cited by examiner

*Primary Examiner* — Michael J. Zanelli
(74) *Attorney, Agent, or Firm* — WRB-IP LLP

(57) ABSTRACT

A method is aimed at controlling a steer-by-wire steering system of a vehicle having at least one steering axle having at least two steer wheels electronically controlled by a control member. In the case of asymmetric adhesion conditions, the method anticipates steering into the skid for the first steer wheel that is on the surface exhibiting the higher coefficient of adhesion—for example asphalt—so as to counter a moment applied to the Z-axis. At the same time, the second steer wheel which is on the surface having the lower coefficient of adhesion—for example a sheet of black ice—remains in the vehicle direction of travel or is oriented towards the second steer wheel in a snow plough mode. The vehicle stability is vastly improved when the vehicle regains an area of uniform adhesion.

17 Claims, 3 Drawing Sheets

METHOD FOR CONTROLLING A STEER-BY-WIRE STEERING SYSTEM

BACKGROUND AND SUMMARY

The present invention relates to a method for controlling a steer-by-wire steering system.

Traditionally, in a land vehicle, the steering, that is to say all of the means that are used to direct the course followed by the vehicle, is produced using a mechanism which connects a control member, generally a steering wheel, to at least one steering axle generally comprising two steer wheels and which makes it possible to alter the orientation of the wheels with respect to the vehicle. The mechanism may be power-assisted by electrical or hydraulic means in order to facilitate the transmission of the force used to turn the control member up to each wheel of the steering axle.

There is also another type of steering system known as steer-by-wire steering in which the control member is mechanically decoupled from the steering axle.

Schematically speaking, a steer-by-wire steering system comprises a control member (steering wheel, hand tiller, joystick) on which a driver can act. By acting on the control member, the driver sets a direction to be given to the vehicle; the movement that the driver applies to the control member is identified by a position sensor (an angle sensor in the case where the control member is a steer wheel); the signal originating from the position sensor that senses the position of the control member is processed appropriately, then transmitted to one or more actuators which can act on the orientation of the wheels with respect to the vehicle, according to the action that the driver has exerted on the control member. It may be emphasized that a resistive torque is applied to the control member so that the driver has a feeling that reproduces the force exerted by the wheel on a running surface. This resistive torque may be a function of numerous factors; these may, for example, include the speed or acceleration of the vehicle, the speed or acceleration of the action exerted by the driver on the control member.

This type of steering has numerous advantages over conventional steering systems. This type of steering in particular reduces the risk of injury by contact with the steering column in the event of an accident and can be readily parameterized. It is also particularly advantageous in the case of industrial vehicles, of the truck type, which are bound by tight architectural constraints and generally have a cabin decoupled from the chassis. A steer-by-wire steering system in particular avoids having to resort to a conventional steering column, which has to be rigidly fixed both to the cabin and to the chassis.

Thanks to the electronic control exerted on the wheel orientation actuator or actuators, it becomes possible to use the steering as an element to make the running of a vehicle safer. It is thus possible, under particular driving circumstances, to give the steer wheels an orientation that may make it possible to maintain the stability of the vehicle and thus avoid a loss of control of the vehicle that could possibly lead to an accident.

One driving circumstance that potentially leads to accidents may be braking on an area where the adhesion is asymmetric; that is to say on an area that exhibits different coefficients of adhesion.

Typically, this type of circumstance is encountered when a vehicle is running along a road, which has a sheet of black ice or a puddle. In such a scenario, one wheel of the steering axle may find itself on a surface that exhibits good adhesion while the second wheel of the steering axle may find itself on a surface of low adhesion; insofar as these two wheels are subjected to the same braking action, the vehicle may then pivot, with respect to the wheel which is in contact with the surface of higher adhesion, and this may cause sideslip as the rear axle steps out. This is commonly known as "swapping ends" when the vehicle pivots through 180°. In other words, the yaw Rz, that is to say the moment of the force applied to the Z-axis of the vehicle, exceeds a value that the vehicle can withstand and the vehicle no longer follows the course set for it by the driver.

To combat this type of incident it is known, for example, in the case of a vehicle equipped with an antilock braking system (ABS), to regulate the braking power at the wheel in contact with the running surface having the lower coefficient of adhesion to prevent this wheel from locking up. That nonetheless has the negative consequence of an overall loss in braking power and a lengthening of the vehicle stopping distance because the braking system uses, as its reference, the wheel that is in contact with the surface of lower adhesion.

Another measure that makes it possible to combat sideslip in the case of braking on a surface that has asymmetric adhesion is to steer into the skid; this measure is aimed at orienting the steer wheels in the opposite direction to the direction of sideslip. In the case of steer-by-wire steering, it is possible in a sideslip situation to act on the steering actuator or actuators in order to steer into the skid even before the driver has reacted to the sideslip situation. It may be recalled on this subject that the reaction time of a driver is 0.7 second at best, whereas a steer-by-wire steering system can act on the wheels in a far shorter space of time.

A problem may nonetheless arise when the vehicle, the steer wheels of which have had opposite lock applied to them, leaves the area of asymmetric adhesion. What happens then is that the vehicle is in a condition in which its steer wheels are not along the axis of the vehicle although the conditions of adhesion are such that the two wheels are in contact with a surface exhibiting a uniform coefficient of adhesion.

Thus, it appears that the way of managing a vehicle that has to brake on a surface exhibiting asymmetric adhesion is not entirely satisfactory.

It is desirable that is to propose a method for controlling a steer-by-wire steering system that makes it possible to stabilize the path of a vehicle during a transition from an area of asymmetric adhesion to an area of uniform adhesion.

It is also desirable that is to propose a method for controlling a steer-by-wire steering system that makes it possible to stabilize the path of a vehicle in the braking phase during a transition from an area of asymmetric adhesion to an area of uniform adhesion.

According to an aspect of the present invention, a method is provided for controlling a steer-by-wire steering system of a vehicle having at least one steering axle having at least two steer wheels controlled by a control member. The method can comprise the steps of: detecting a difference in behaviour between a first steer wheel and a second steer wheel thereby indicating asymmetric steer wheel adhesion, the first steer wheel being in contact with a first area which exhibits a first coefficient of adhesion and the second steer wheel being in contact with a second area which exhibits a second coefficient of adhesion, the first coefficient of adhesion being higher than the second coefficient of adhesion; calculating a theoretical yaw parameter as a function at least of the actual speed of the vehicle and of the actual position of the control member; measuring the actual yaw parameter using a yaw sensor; comparing the actual yaw parameter with the theoretical yaw parameter; angling the wheel in contact with the area exhibiting the first coefficient of adhesion by an angle θ1, whereby the first steer wheel is oriented in a direction opposing the yaw, and angling the wheel in contact with the area exhibiting the second coefficient of adhesion by an angle θ2, with θ2 being comprised between a value whereby the second steer wheel is oriented substantially in the vehicle direction of travel and a value whereby the second steer wheel is oriented towards the first steer wheel, if the difference between the actual yaw parameter and the theoretical yaw exceeds a reference data.

The method according to the invention has the notable effect of not maintaining the near-parallel configuration of the steer wheels when these are steered into the skid in order to combat a yaw Rz applied about the Z-axis of the vehicle. In the case of asymmetric adhesion conditions, the method anticipates steering into the skid for the first steer wheel that is on the surface exhibiting the higher coefficient of adhesion—for example asphalt—so as to counter a moment applied to the Z-axis. At the same time, the second steer wheel which is on the surface having the lower coefficient of adhesion—for example a sheet of black ice or a puddle—remains in the vehicle direction of travel or is oriented towards the second steer wheel. In the latter scenario, the steer wheels are oriented in opposite and converging directions and adopt a "snowplough" position. Thus, when the vehicle leaves an area of asymmetric adhesion to regain an area of uniform adhesion, the behaviour of the vehicle is far more stable than when the vehicle regains an area of uniform adhesion with its two steer wheels in a position of steering into the skid. It may be noted that the fact of not steering into the skid, for the steer wheel that is in contact with the surface having the lower coefficient of adhesion, has no major impact on the action aimed at countering the yaw Rz. The action aimed at countering the yaw Rz is essentially due to the steer wheel that is in contact with the surface having the higher coefficient of adhesion; the action of the wheel in contact with the surface having the lower coefficient of adhesion is in any event limited.

In a possible embodiment, the method according to the invention can be implemented for controlling a steering system of a vehicle having at least one steering axle having at least two steer wheels; the steer-by-wire-type steering system can comprise, in particular: at least one sensor making it possible to identify the position of a control member; two actuators able to act respectively on each of the steer wheels in order to orient them independently by an angle θ1 and θ2 with respect to the longitudinal axis of the vehicle; a CPU able to receive an input signal originating from the sensor and able to emit an output signal bound for each of the actuators.

The method for controlling this steering system comprises the steps of: detecting a difference in behaviour between a first steer wheel and a second steer wheel thereby indicating asymmetric steer wheel adhesion, the first steer wheel being in contact with a first area which exhibits a first coefficient of adhesion and the second steer wheel being in contact with a second area which exhibits a second coefficient of adhesion, the first coefficient of adhesion being higher than the second coefficient of adhesion; calculating a theoretical yaw parameter as a function at least of the actual speed of the vehicle and of the actual position of the control member; measuring the actual yaw parameter using a yaw sensor; comparing the actual yaw parameter with the set-point yaw parameter; acting on the actuator of the first steer wheel in contact with the area exhibiting the first coefficient of adhesion in order to angle the steer wheel by an angle θ1 such that the first steer wheel is oriented in a direction opposing the yaw; and acting on the actuator of the second steer wheel in contact with the area exhibiting the second coefficient of adhesion in order to angle the wheel by an angle θ2, with θ2 being comprised between a value whereby the second steer wheel is oriented substantially in the vehicle direction of travel and a value whereby the second steer wheel is oriented towards the first steer wheel, if the difference between the actual yaw parameter and the theoretical yaw exceeds a reference data.

According to a favourite form of the invention, the step of detecting the difference in adhesion between the two steer wheels is performed while the vehicle is under braking, because it is under braking that the vehicle is most likely to escape the control of its driver.

In one implementation of the method according to the invention, the angle θ2 formed by the steer wheel in contact with the surface having the lower coefficient of adhesion and the longitudinal axis of the vehicle can be nil. This scenario can be especially advantageous when the vehicle runs on a straight line and brakes on an asymmetrical adhesion surface. The steer wheel which is in contact with the area having a high coefficient of adhesion is angled so as to combat the yaw but the steer wheel, which is in contact with an area exhibiting a low coefficient of adhesion, can remain in the longitudinal axis of the vehicle. This may be advantageous when the braking set-point is not very high, that is to say when the driver merely wishes to slow his vehicle down.

In another implementation of the invention, the angle θ2 formed by the steer wheel in contact with the surface having the lower coefficient of adhesion and the longitudinal axis of the vehicle is oriented in a direction equal to the direction of the yaw speed and is greater than zero. The vehicle is then in a configuration in which its steer wheels form a "snowplough" and this enhances the effectiveness of the braking while at the same time keeping the vehicle in a straight line when the vehicle regains conditions of uniform adhesion. This might be advantageous if the vehicle driver wants to bring his vehicle to a complete stop.

It can be preferentially anticipated for the angle θ1 formed by the steer wheel in contact with the surface having the higher coefficient of adhesion and the longitudinal axis of the vehicle and for the angle θ2 formed by the steer wheel in contact with the surface having the lower coefficient of adhesion and the longitudinal axis of the vehicle to be oriented in opposite directions and to have the same magnitude. This makes it possible to maintain symmetry in the orientation of the wheels and this is beneficial to the stability of the vehicle in the transition between an area of asymmetric adhesion and an area of symmetric adhesion.

In the case of a vehicle running along a curve, the steer wheels of the vehicle are respectively angled by θ1$i$ and θ2$i$; θ1$i$ and θ2$i$ are substantially equal and are a function of the radius of the curve. Should a vehicle encounter asymmetrical adhesion conditions, the method may comprise the step of modifying the initial angles θ1$i$ and θ2$i$ formed respectively by the steer wheels with the longitudinal axis of the vehicle by respectively θ1 and θ2.

In one practical embodiment of the method according to the invention, the step of detecting a difference in behaviour thereby indicating asymmetric steer wheel adhesion, one wheel being in contact with an area having a first coefficient of adhesion and one wheel being in contact with a surface of low adhesion, is performed using the speed sensors of each of the steer wheels of an antilock braking (ABS) system.

These and other advantages will become apparent upon reading the following description in view of the drawing attached hereto representing, as a non-limiting example, an embodiment of a seat according to the invention.

BRIEF DESCRIPTION OF THE DRAWINGS

The following detailed description of embodiments of the invention is better understood when read in conjunction with the appended drawing being understood, however, that the invention is not limited to the specific embodiments disclosed. In the drawing.

DETAILED DESCRIPTION

Figure 1:
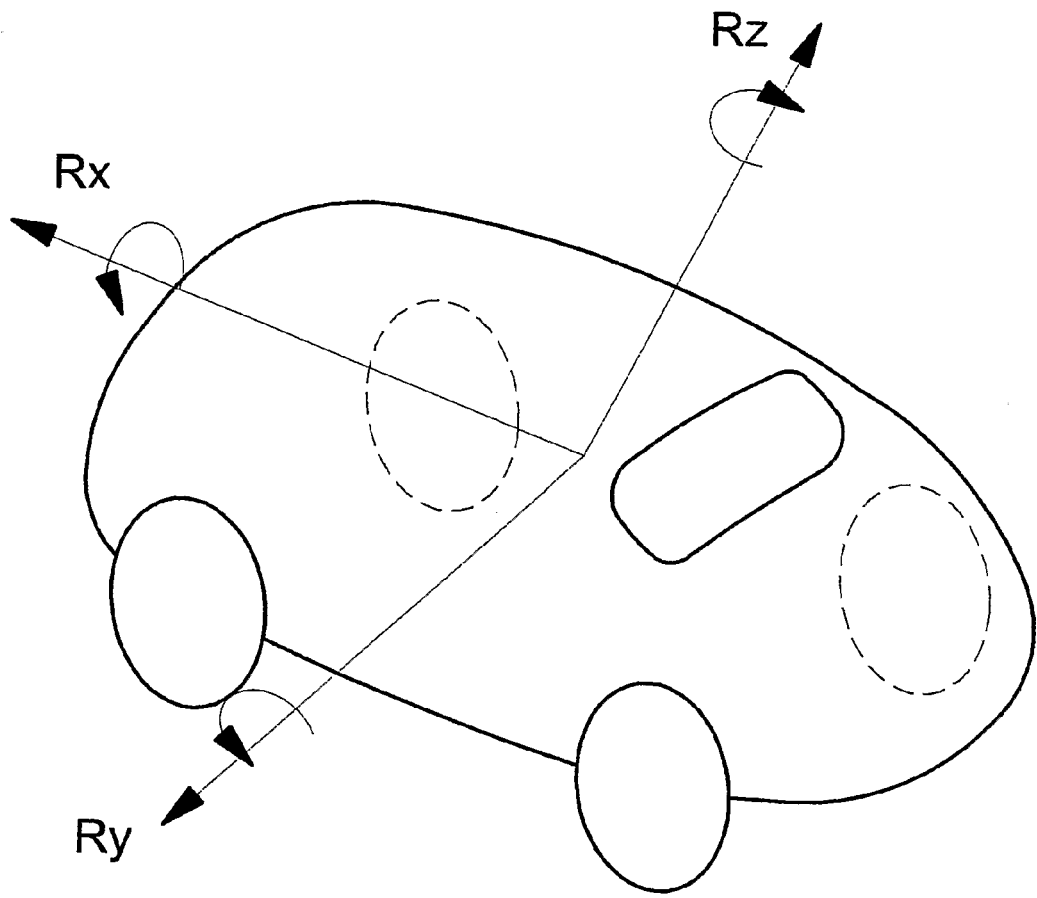
FIG. 1 shows a vehicle with the forces and moments exerted on said vehicle.

First of all, let us remember that a vehicle which is moving along is subjected to the action of three forces which are: the drag Fx, the sideslip Fy, and the lift Fz. The moments of these forces are determined with respect to a frame of reference centred on the centre of gravity of the vehicle and having three orthogonal axes X—longitudinal—, Y—transverse—, Z—vertical—. As represented in FIG. 1, these moments are:

roll Rx, in the case of drag,
pitch Ry, in the case of sideslip,
yaw Rz, in the case of lift.

The stability of the vehicle is inversely proportional to the moments of these forces; in other words, the better these forces are minimized, the more stable a vehicle is.

Figure 2:
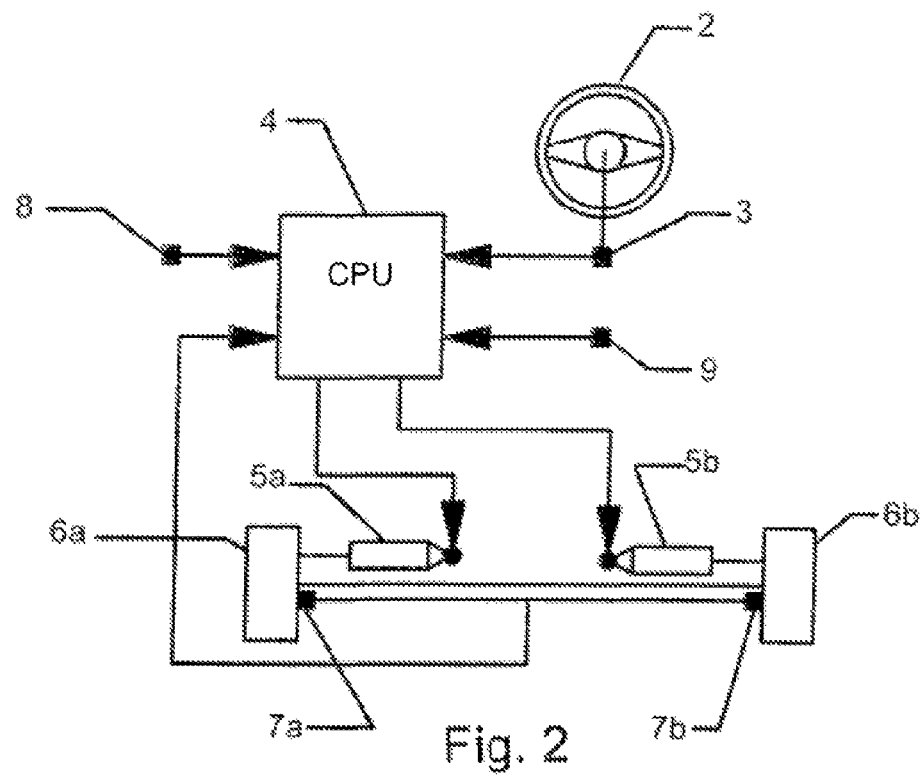
FIG. 2 is a block diagram of a steer-by-wire steering system employing one embodiment of the method according to the invention.

Referring first of all to FIG. 2, it is possible to see that the steer-by-wire steering system can comprise a control member. 2 which, in the case illustrated, is a steer wheel. The control member 2 could be a hand tiller, a lever or a rudder bar. It is by virtue of this member that the driver sets a set-point path to be given to the vehicle.

The angle that a driver applies to the control member 2 is measured by a sensor 3, the signal of which is transmitted to a CPU 4. The CPU 4 can suitably include a microprocessor, a data memory such as a RAM memory and a program memory such as a ROM memory.

According to a preloaded calculation routine, the CPU 4 generates an output signal, which can be transmitted to two actuators 5a, 5b responsible, respectively, for orienting two steer wheels 6a, 6b with respect to the longitudinal axis of the vehicle.

In the example depicted, it may also be noted that each of the steer wheels 6a, 6b can be equipped with an antilock braking system (ABS system) comprising, in a known way, wheel speed sensors 7a, 7b which can be connected to a CPU (not depicted in the drawing). This CPU is able to limit the extent to which the wheels lock up under braking on a surface that offers very little adhesion.

To implement the method according to the invention the vehicle can also be equipped with a yaw sensor 8. The yaw sensor 8 measures the yaw speed, that is to say the rotational speed of the chassis about its vertical axis. The yaw sensor 8 can be situated at the centre of the vehicle near the centre of gravity or, if it is positioned at a location offset from the centre, an electronic program repositions it in a virtual sense at the centre of gravity.

The data measured by the yaw sensor 8 can be used in an electronic stability system (ESP) preventing sideslip for controlling the path followed, and which does not form part of the present invention.

In the method according to the invention, the data measured by the yaw sensor 8 can be compared with a theoretical yaw speed. The theoretical yaw speed can be determined as a function of the angle that the driver has given to the control member 2 and the speed of the vehicle. Other parameters may be taken into consideration in determining the theoretical yaw speed such as the load of the vehicle.

Figure 4:
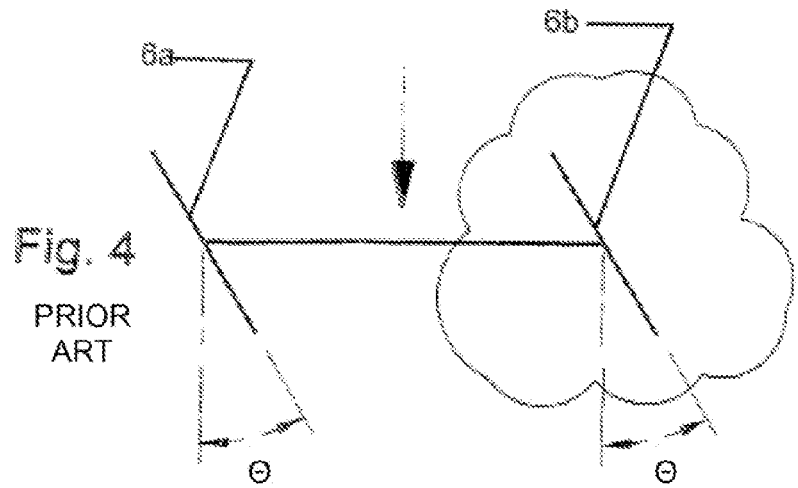
Figure 5:
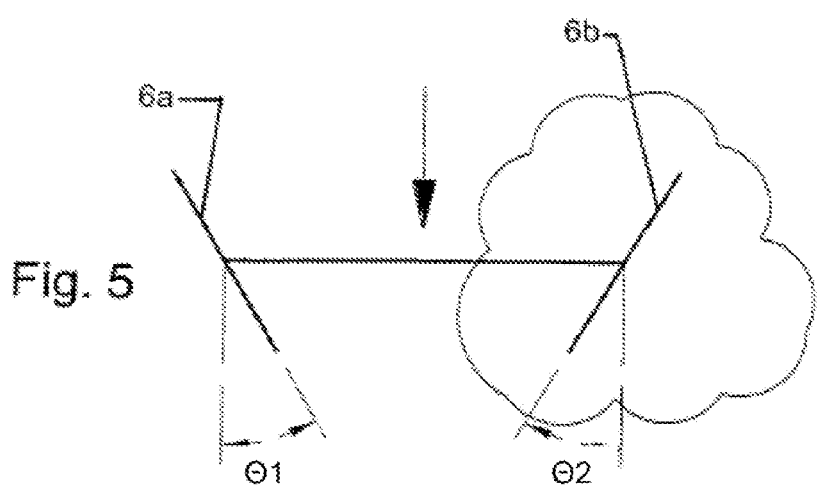
Figure 6:
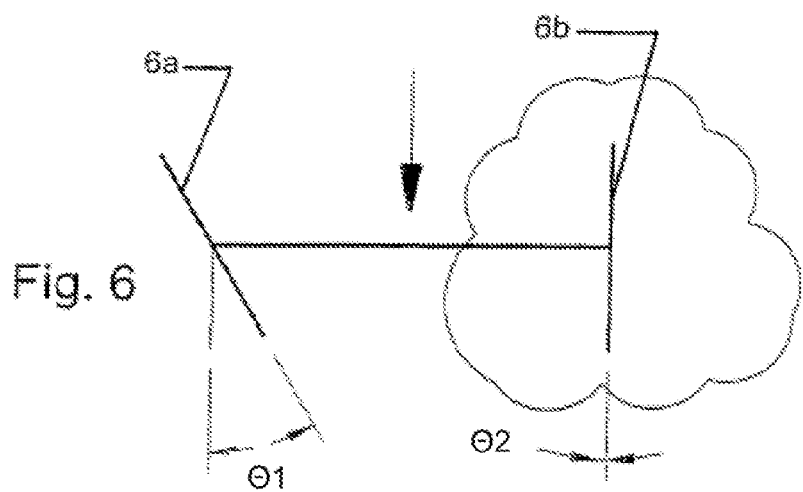

As has been seen, an aspect of the invention is to improve the stability of a vehicle when it is running along a surface with asymmetric adhesion. This type of condition may be encountered, for example, when the vehicle is running along a road surface partially covered in black ice. In this case, one steer wheel 6a may find itself on an area exhibiting low adhesion—for example, black ice—while the other steer wheel 6b finds itself on an area exhibiting good adhesion—for example, dry tarmac—; this type of condition is extremely commonplace particularly in the winter period and may cause accidents through the driver losing control of his vehicle. In FIGS. 4 to 6, the area of low adhesion is symbolically bounded by dotted lines.

In such a scenario, if the driver commands his vehicle to brake, the braking is unbalanced because the steer wheels 6a, 6b are in contact with a surface that has different coefficients of adhesion.

This imbalance can be picked up by the wheel speed sensors 7a, 7b of the ABS braking system.

Figure 3:
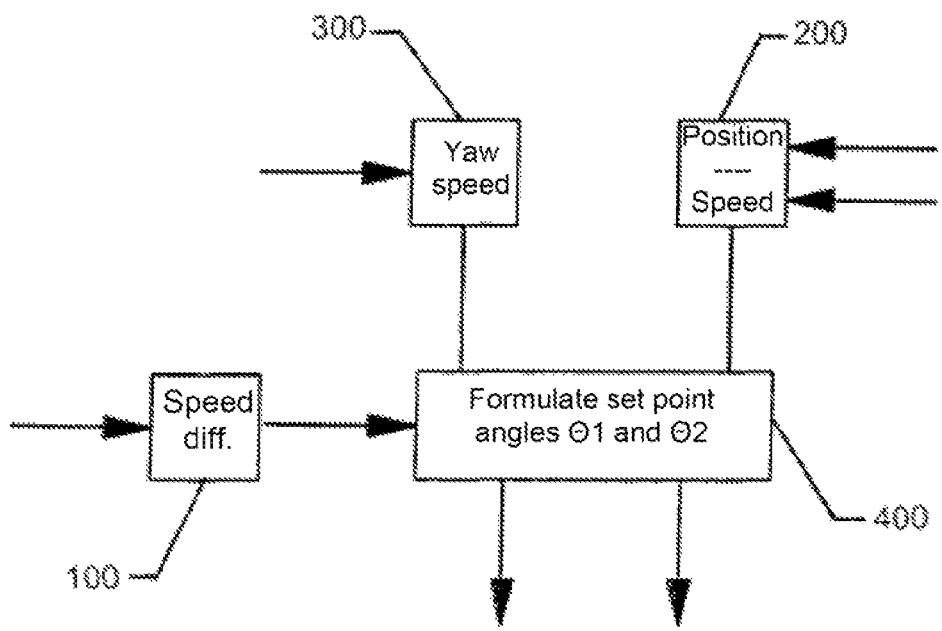
FIG. 3 is a simplified diagram illustrating one possible method of formulating signals applied to actuators responsible for orienting the steer wheels, FIG. 4 schematically shows a known way of combating a loss of control of a vehicle on an area of asymmetric adhesion, FIG. 5 schematically shows one possible way according to the method of the invention of combating a loss of control of a vehicle in an area of asymmetric adhesion, FIG. 6 schematically shows another possible way according to the method of the invention of combating a loss of control of a vehicle in an area of asymmetric adhesion.

A signal originating from the ABS speed sensors 7a, 7b can be carried to the CPU 4 indicating a difference between the speeds of the steer wheels 6a, 6b, and this testifies to asymmetry in the conditions of adhesion between the two steer wheels; this is represented by the block 100 in FIG. 3.

The consequence of this imbalance is that the vehicle may go into oversteer, that is to say may experience sideslip as its back end steps out.

In the form illustrated, in the step 200 the CPU 4 can receive a signal originating from the sensor 3 connected to the control member 2 indicating the position thereof, and a signal originating from a speed sensor 9 indicating the speed of the vehicle. Using these two signals, the computer can formulate a theoretical yaw speed.

At the same time, in the step 300, the CPU 4 can receive from the yaw sensor 8 the actual yaw speed that the vehicle is experiencing.

In the current situation, that is to say under braking in an area of asymmetric adhesion leading to oversteer, the actual yaw speed is different from the theoretical yaw speed, and is greater than the latter.

In concrete terms, this is manifested in the fact that the vehicle can escape the control of its driver that is to say that the vehicle no longer follows the set-point path that the driver wishes to give to his vehicle. This thus results in a loss of control of the vehicle.

If the difference between the actual yaw parameter and the theorical yaw parameter exceeds a reference data—threshold value or a function of the difference such as a variation rate of the difference—, the CPU 4 then formulates a set-point angle θ1 and θ2 to be applied to each of the steer wheels 6a,6b of the vehicle in order to combat the oversteer, and this is represented by block 400 in FIG. 3.

FIG. 4 illustrates a conventional way of combating oversteer, that is to say of opposing the yaw moment Rz. This conventional method is to orient each of the steer wheels 6a, 6b by an angle θ. The important point to note is that the two steer wheels 6a, 6b are oriented by substantially the same angle in the opposite direction to the direction in which the moment is applied to the vehicle.

The problem is then that the vehicle, which continues its journey, regains conditions of uniform adhesion. Now, given that the actuators 5a, 5b cannot instantaneously re-orient the wheels 6a, 6b along the axis of the vehicle when the vehicle regains conditions of uniform adhesion, the stability of the vehicle is greatly disrupted.

In order to remedy that, in the method according to the invention, the CPU 4 formulates a set-point angle $\theta 1$ for the wheel 6a which is on the surface of greater adhesion. The angle $\theta 1$ is oriented in the direction opposite to the direction of the moment Rz to combat the oversteering of the vehicle.

By contrast, the CPU 4 formulates a set-point angle $\theta 2$ for the wheel 6b which is on the surface of lower adhesion. The set-point angle $\theta 2$ is different from the set-point angle $\theta 1$; the near-parallel configuration normally found between two steer wheels is not maintained.

It is, for example, possible to anticipate two scenarios as far as the orientation of the steer wheels 6a, 6b is concerned.

One scenario which is illustrated in FIG. 5 is to formulate a set-point angle $\theta 2$ that is not nil but oriented in the same direction as the moment Rz applied to the vehicle as a result of the asymmetric adhesion conditions. What this amounts to is placing the two wheels 6a, 6b in a configuration in which the steer wheels 6a,6b converge and thus adopt a configuration that could be called a snowplough configuration. This first scenario may be encouraged when the braking set-point is high—for example, when the driver wishes to bring his vehicle to rest; this is because the vehicle is then in a configuration in which its steer wheels are in a snowplough configuration, which enhances the effectiveness of the braking action while at the same time keeping the vehicle in a straight line when the vehicle regains conditions of uniform adhesion. It is preferable for the angles $\theta 1$ and $\theta 2$, which are oriented in opposite directions, to have the same magnitude in order to preserve the equilibrium of the vehicle when it regains conditions of uniform adhesion. The transition between the area of asymmetric adhesion and the area of uniform adhesion therefore takes place with markedly less disruption than in the case of steer wheels oriented as shown in FIG. 4.

Another scenario which is illustrated by FIG. 6 may anticipate formulating a zero set-point angle $\theta 2$; the steer wheel 6b then remains along the axis of the vehicle. This other scenario may be encouraged when the braking set-point is not very high—for example when the driver merely wishes to slow his vehicle down; what actually happens is that one of the wheels—the wheel in contact with the surface of lower coefficient of adhesion—is along the axis of the vehicle, and is thus in position for the vehicle to continue along its path.

It may also be anticipated for the orientation of the wheel 6b to be varied between a position in which $\theta 2$ is nil and a position in which $\theta 2$ is not nil as a function of a driving parameter such as, for example, a variation in the braking set-point given by the driver.

It must be appreciated that although the method according to the invention has been described in relation to a vehicle braking on asymmetrical adhesion condition and running in a straight line, the method can of course be implemented in a vehicle braking on asymmetrical adhesion condition and running in a curve. In this latter case, the wheel 6a, 6b can already be angled by initial angles $\theta 1 i$ and $\theta 2 i$—$\theta 1 i$ and $\theta 2 i$ depend on the radius of the curve—when the vehicle reaches an area of on asymmetrical adhesion. The initial orientations $\theta 1 i$ and $\theta 2 i$ of the wheels 6a, 6b are modified respectively by $\theta 1$ and $\theta 2$, $\theta 1$ and $\theta 2$ being formulated in the same way as they are previously in the case of a vehicle running in a straight line.

Of course, the invention is not limited to the embodiment just described but on the contrary encompasses all embodiments thereof.

The invention claimed is:

1. A method for controlling a steer-by-wire steering system of a vehicle having at least one steering axle having at least two steer wheels each controlled by a control member, wherein the method comprises:
    detecting a difference in behaviour between a first steer wheel and a second steer wheel thereby indicating, asymmetric steer wheel adhesion, the first steer wheel being in contact with a first area which exhibits a first coefficient of adhesion and the second steer wheel being in contact with a second area which exhibits a second coefficient of adhesion, the first coefficient of adhesion being higher than the second coefficient of adhesion,
    calculating a theoretical yaw parameter as a function at least of an actual speed of the vehicle and of an actual position of the control member,
    measuring an actual yaw parameter using a yaw sensor,
    comparing the actual yaw parameter with the theoretical yaw parameter,
    angling the first steer wheel in contact with the area exhibiting the first coefficient of adhesion by a first angle whereby the first steer wheel is oriented in a direction opposing the yaw and angling the second steer wheel in contact with the area exhibiting, the second coefficient of adhesion by a second angle wherein the second angle is between a value such that the second steer wheel is oriented substantially in a vehicle direction of travel, and a value whereby the second steer wheel is oriented towards the first steer wheel, if a difference between the actual yaw parameter and the theoretical yaw parameter exceeds a reference data.

2. The method according, to claim 1 for controlling a steer-by-wire steering system of a vehicle having at least one steering axle having at least two steer wheels, the steering system comprising in particular:
    at least one means for sensing capable of detecting the position of a control Member,
    at least two actuators capable of acting respectively on each of the steer wheels in order to orient the first and second steer wheel independently by the first and second angles, respectively, with respect to the longitudinal axis of the vehicle,
    means for processing able to receive an input signal originating from the sensing means and able to emit an output signal bound for each of the actuators, wherein the method comprises:
    acting on the actuator of the first steer wheel in contact with the area exhibiting the first coefficient of adhesion in order to angle the steer wheel by the first angle such that the first steer wheel is oriented in the direction opposing the yaw; and acting on the actuator of the second steer wheel in contact with the area exhibiting the second coefficient of adhesion in order to angle the wheel by the second angle, with the second angle being between the value such that the second steer wheel is oriented substantially in the vehicle direction of travel and the value whereby the second steer wheel is oriented towards the first steer wheel, if the difference between the actual yaw parameter and the theoretical yaw exceeds the reference data.

3. The method according to claim 2, wherein the step of detecting the difference in behaviour between the two steer wheels is performed while the vehicle is under braking.

4. The method according to claim 3, wherein the second angle formed by the second steer wheel exhibiting a second coefficient of adhesion and the longitudinal axis of the vehicle is nil.

5. The method according to claim 4, wherein the second angle formed by the second steer wheel exhibiting the second coefficient of adhesion and the longitudinal axis of the vehicle is oriented in a direction equal to the direction of the yaw speed and is greater than 0.

6. The method according to claim 5, wherein the first angle formed by the first steer wheel having the first coefficient of adhesion and the longitudinal axis of the vehicle and the second angle formed by the second steer wheel in contact with the surface having the second coefficient of adhesion and the longitudinal axis of the vehicle are oriented in opposite directions and have the same magnitude.

7. The method according to claim 6, wherein it comprises the step of modifying initial angles formed respectively by the first and second steer wheels with the longitudinal axis of the vehicle by respectively the first and second angles.

8. The method according to claim 7, wherein the step of detecting a difference in behaviour thereby indicating asymmetric steer wheel adhesion, one wheel being in contact with an area having a first coefficient of adhesion and one wheel being in contact with a surface of low adhesion, is performed using speed sensors of each of the first and second steer wheels of an and Jock braking system.

9. The method according to claim 2, wherein the second angle formed by the second steer wheel exhibiting a second coefficient of adhesion and the longitudinal axis of the vehicle is nil.

10. The method according to claim 9, wherein the second angle formed by the second steer wheel exhibiting the second coefficient of adhesion and the longitudinal axis of the vehicle is oriented in a direction equal to the direction of the yaw speed and is greater than 0.

11. The method according to claim 2, wherein the first angle formed by the first steer wheel having the first coefficient of adhesion and the longitudinal axis of the vehicle and the second angle formed by the second steer wheel in contact with the surface having the second coefficient of adhesion and the longitudinal axis of the vehicle are oriented in opposite directions and have the same magnitude.

12. The method according to claim 2, wherein it comprises the step of modifying initial angles formed respectively by the first and second steer wheels with the longitudinal axis of the vehicle by respectively the first and second angles.

13. The method according to claim 1, wherein the step of detecting the difference in behaviour between the two steer wheels is performed while the vehicle is under braking.

14. The method according to claim , wherein the second angle formed by the second steer wheel exhibiting a second coefficient of adhesion and the longitudinal axis of the vehicle is nil.

15. The method according to claim 14, wherein the second angle formed by the second steer wheel exhibiting the second coefficient of adhesion and the longitudinal axis of the vehicle is oriented in a direction equal to the direction of the yaw speed and is greater than 0.

16. The method according to claim 1, wherein the first angle formed by the first steer wheel having the first coefficient of adhesion and the longitudinal axis of the vehicle and the second angle formed by the second steer wheel in contact with the surface having the second coefficient of adhesion and the longitudinal axis of the vehicle are oriented in opposite directions and have the same magnitude.

17. The method according to claim 1, wherein it comprises the step of modifying initial angles formed respectively by the first and second steer wheels with the longitudinal axis of the vehicle by respectively the first and second angles.

* * * * *